L. C. MERRELL.
PROCESS FOR DESICCATING.
APPLICATION FILED APR. 23, 1912.
1,082,469.
Patented Dec. 23, 1913.
4 SHEETS—SHEET 4.
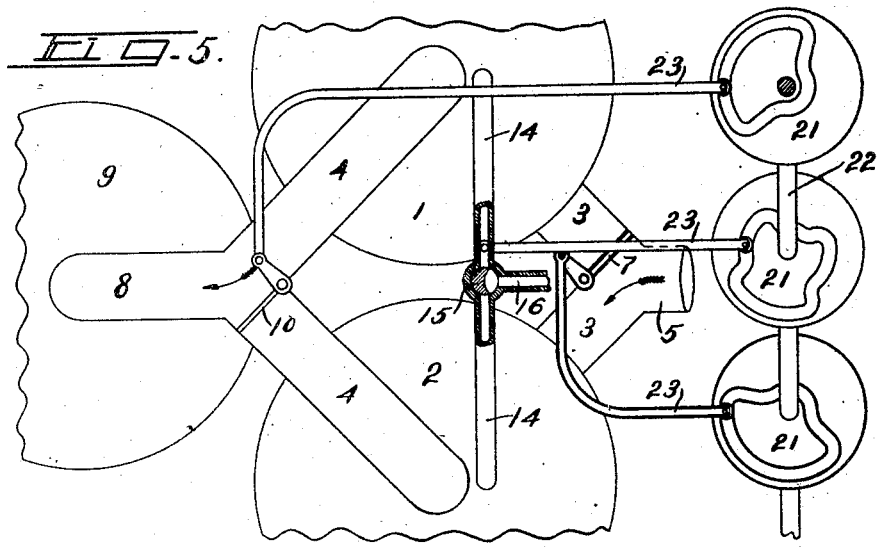
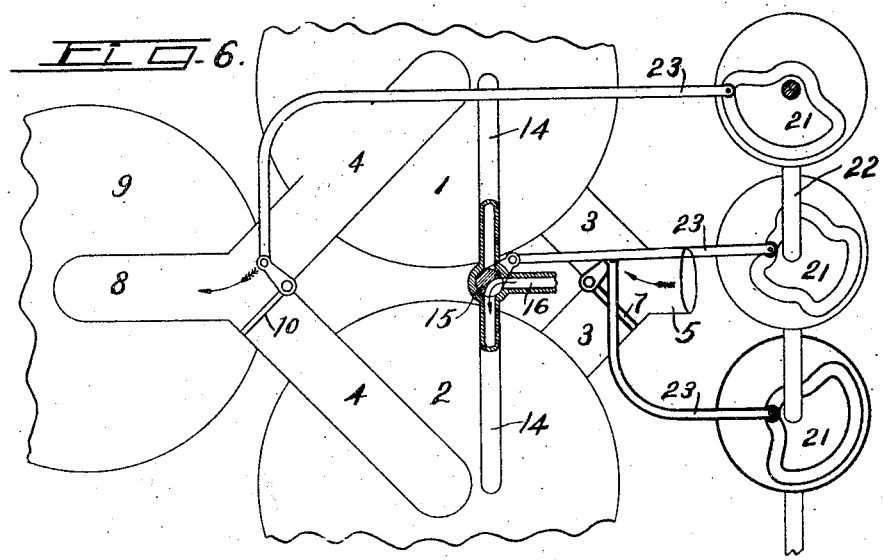

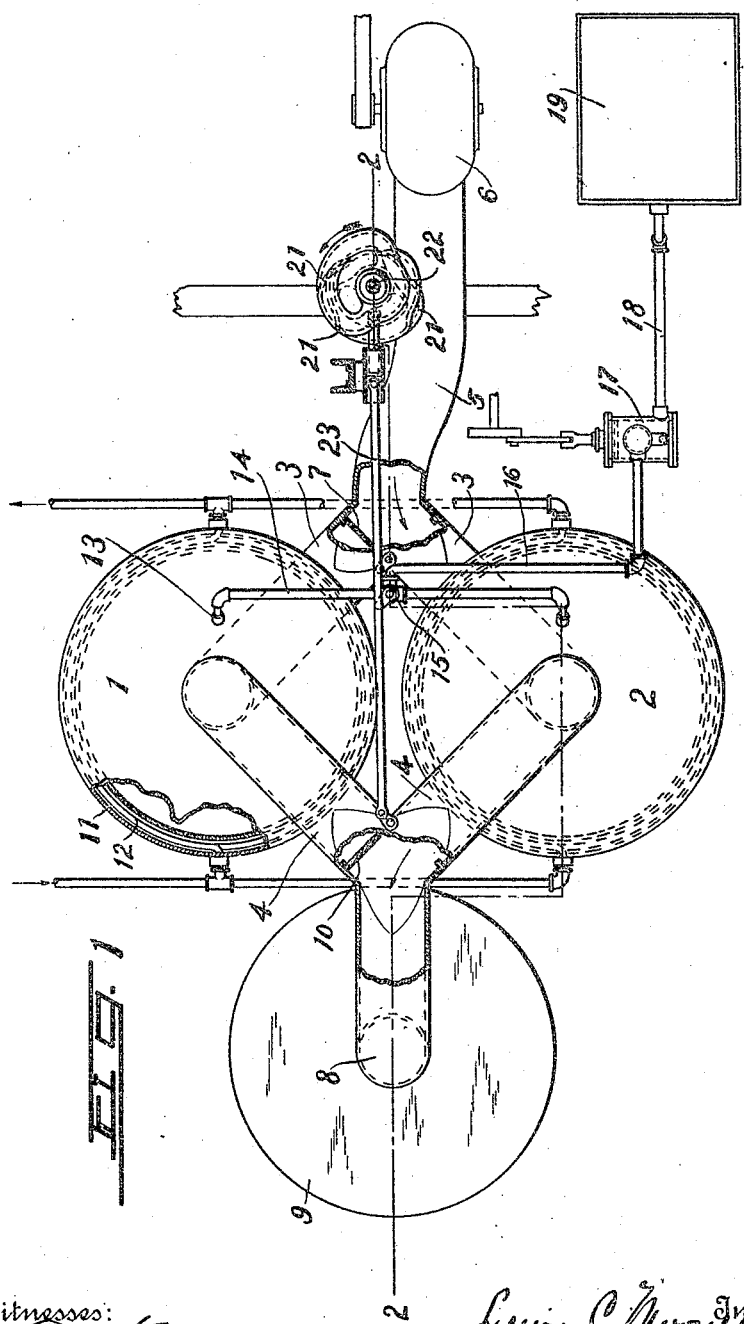

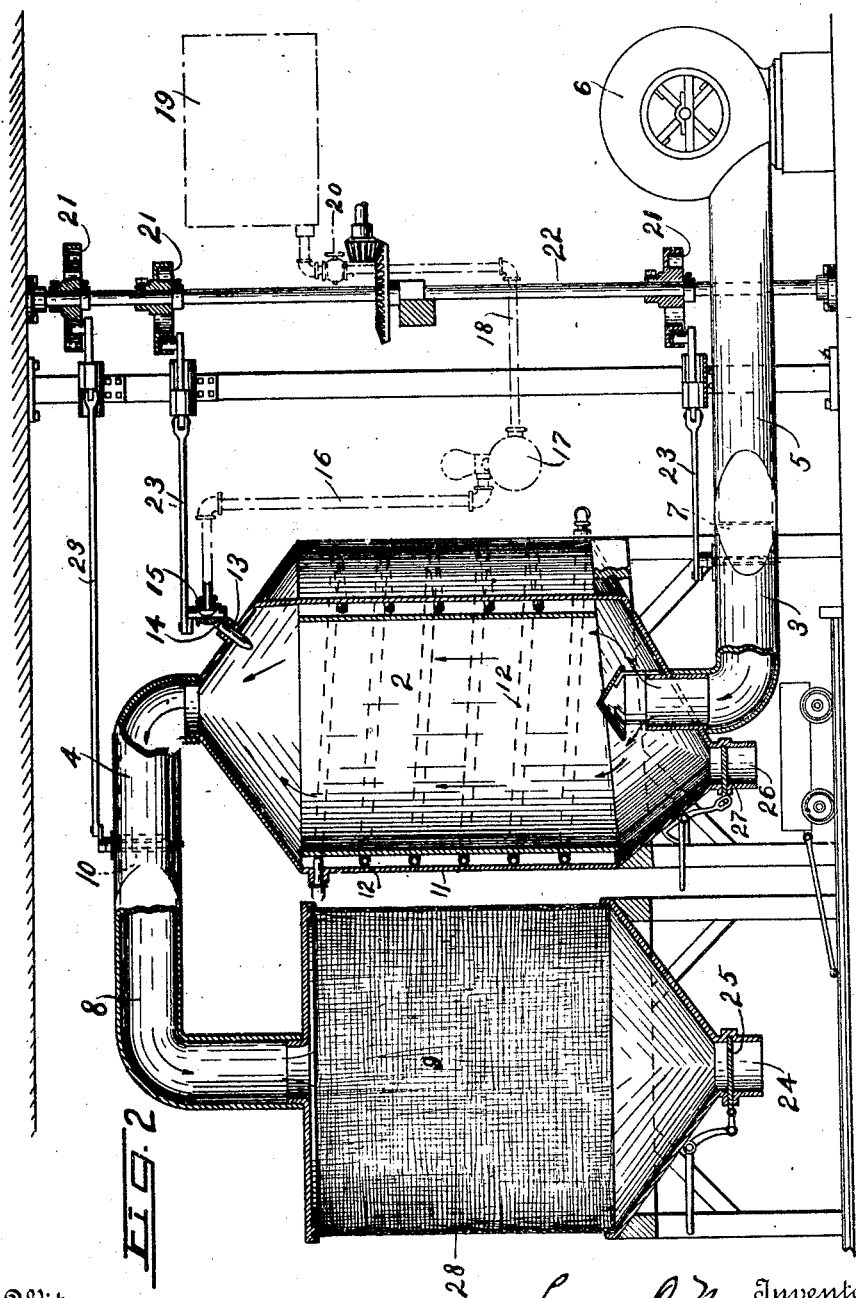

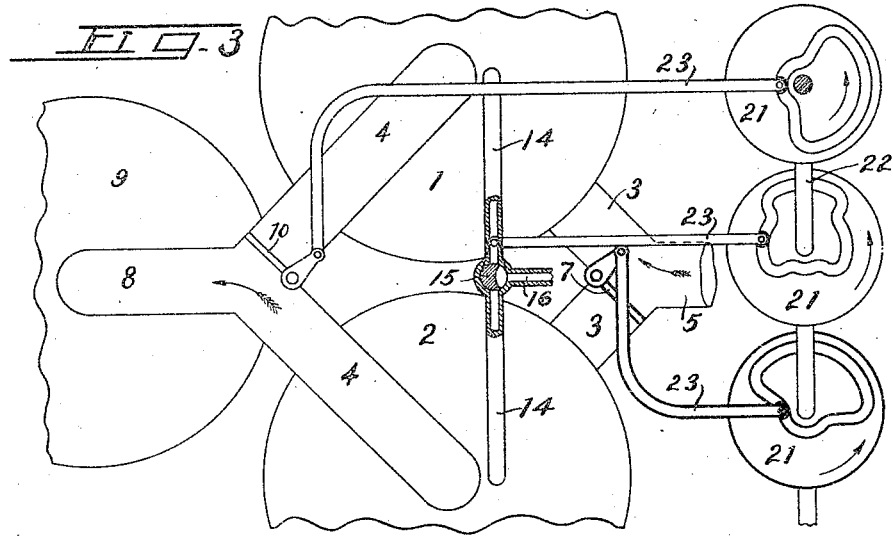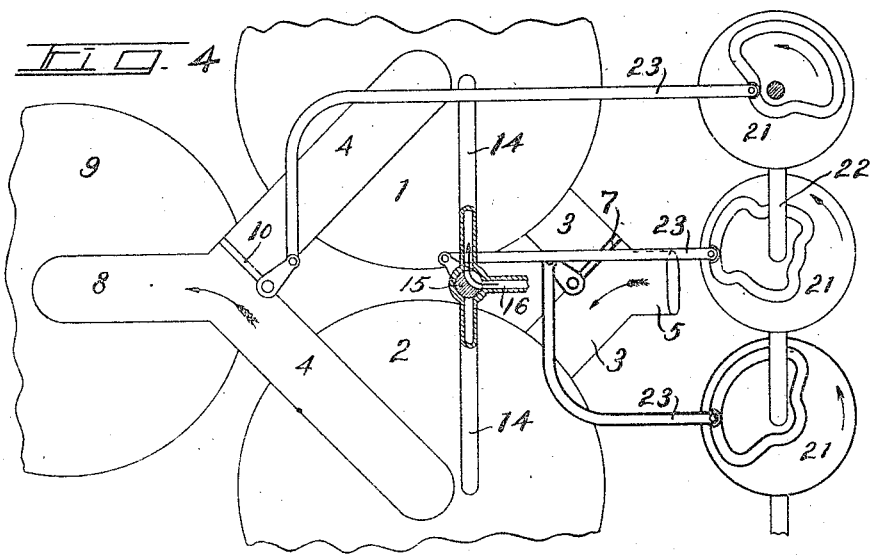

UNITED STATES PATENT OFFICE.

LEWIS C. MERRELL, OF SYRACUSE, NEW YORK, ASSIGNOR TO MERRELL-SOULE COMPANY, OF SYRACUSE, NEW YORK, A CORPORATION OF NEW YORK.

PROCESS FOR DESICCATING.

1,082,469.  Specification of Letters Patent.   Patented Dec. 23, 1913.

Original application filed April 29, 1911, Serial No. 624,186. Divided and this application filed April 23, 1912. Serial No. 692,659.

*To all whom it may concern:*

Be it known that I, LEWIS C. MERRELL, of Syracuse, in the county of Onondaga, in the State of New York, have invented new and useful Improvements in Processes for Desiccating, of which the following, taken in connection with the accompanying drawings, is a full, clear, and exact description.

This invention relates to improvements in a process of separating the moisture from the constituent solids of liquids, and is more particularly related to the process covered by Letters Patent of the United States No. 860,929, granted jointly to myself, Irving S. Merrell and William B. Gere, and dated July 23, 1907, and is a division of application filed April 29, 1911, No. 624,186.

Briefly stated, the process of the patent above mentioned contemplates the treatment of liquids and semi-liquids, such as milk, by first concentrating the same to deprive the substances of a large percentage of the moisture contained therein. The mass so concentrated is then converted into a fine spray, and in this form it is subjected to a desiccating agent, such as a current of dry air or gas, the temperature of which may be regulated, whereby to extract from the concentrated mass substantially all the remaining liquid constituents. During the treatment of the sprayed mass by the air or gas, the latter takes up the moisture remaining after concentration, leaving the solid constituents in the form of a dry powder, and this powder is collected in a suitable space away from the air or gas current, the air or gas being discharged separately from the dry powder.

The process of the patent aforesaid may be termed a continuous process, that is to say, the liquid or semi-liquid is treated while in transit, and in its action upon the liquid or semi-liquid the desiccating agent is also in transit. Hence, neither the liquid or semi-liquid nor the desiccating agent remains for any appreciable time in the desiccating chamber, and the separation of the moisture remaining takes place while the sprayed mass and the desiccating agent are in transit.

The present invention, as distinguished from the process above described, contemplates a process wherein the desiccating agent, as a body of air, is admitted to the desiccating chamber, and when the desired quantity has been so introduced the supply is cut off and the agent confined in said chamber. The substance to be treated is then introduced to the desiccating chamber until the proper quantity, proportioned to the amount of the confined desiccating agent, has entered the chamber, whereupon the flow of the substance is stopped. Evaporation takes place, the solid constituents being deprived of their moisture and becoming reduced to the condition of a fine dry dust. The moisture-laden air is then discharged into a dust collector wherein separation of the air and the dry solids is effected.

As a subordinate feature of the present invention, the same also contemplates a process of the character recited wherein the flow of the desiccating agent and substance to be treated, at periodic stages, is cut off and deflected successively to a plurality of desiccating chambers arranged in battery form, and timed in proper relation to each other to be charged and discharged, thereby increasing materially the output obtained by the practice of the process.

In the drawings:—Figure 1 is a top plan view, partly in section, of a novel apparatus which is designed to carry into effect the herein-described process. Fig. 2 is a vertical sectional view thereof on the line 2—2, Fig. 1, certain portions of the apparatus appearing in elevation. Figs. 3 to 6, inclusive, are diagrammatic views illustrative of certain steps of the process.

It will be understood that the practice of the herein-described process is not limited to any particular form or type of apparatus, and hence the apparatus illustrated in the accompanying drawings is merely indicative of one type which may be employed.

Referring to the drawings, 1 and 2 are a pair of desiccating chambers, which are arranged in battery form, any number of these chambers being employed, and each being provided with an inlet pipe 3 and an outlet pipe 4. The inlet pipes 3 are connected to a supply pipe 5, which supply pipe is, in turn, connected with a suitable pressure device 6. As illustrated in the drawings, the pressure device is in the form of a rotary blower, but any device designed for moving air may be substituted therefor. At the juncture of the inlet pipes 3 with the supply pipe 5 is arranged an inlet valve 7. This valve may be of any suitable construction, but it is illustrated as a pivoted gate, and by reason of its location at the point noted it is obvious that said valve will control connection between the inlet pipes 3 and the supply pipe 5.

The outlet pipes 4 communicate with a discharge pipe 8, the discharge pipe communicating with a dust collector 9. In the illustration of the latter herein it is shown merely in conventional form.

At the juncture of the outlet pipes 4 is arranged an outlet valve 10, which valve is also illustrated as in the form of a pivoted gate, and said valve controls both of the outlet pipes 4 in a manner similar to the control of the inlet pipes 3 by the valve 7.

Each of the desiccating chambers 1 and 2 has a jacket 11, and located in said jacket is a heating coil 12, preferably a steam pipe, whereby the temperature of the contents of the desiccating chamber may be raised, as will be presently described. Each of the desiccating chambers 1 and 2 is also provided with a spraying device 13 for the introduction of the substance to be treated. These spraying devices are in the form of nozzles connected to suitable pipes 14, which pipes 14 are also connected to a three-way valve 15 having communication with a liquid supply pipe 16. The pipe 16 is connected to a high pressure pump 17, and said pump is also connected, by a pipe 18, with a source of liquid supply 19, such as a tank. The pipe 18 is preferably valved, as at 20, to control the supply of the liquid to the pump from the tank 19.

The inlet valve 7, the outlet valve 10, and the three-way valve 15 are actuated by suitable cams 21 carried by a driving shaft 22, and connected with said valves through the medium of links 23, and said cams 21 are so proportioned and designed as to cause proper actuation of said valves in proper relation to each other.

The process is practised in the following manner: The blower 6 having been started, steam is turned into the heating coils 12. The outlet valve 10 is then actuated to close the outlet pipe 4 leading from the chamber 1, and at the same time the inlet valve 7 is actuated to open the inlet pipe 3 of said chamber 1 to connection with the supply pipe 5. This causes the air from the blower 6 to enter the chamber 1 under pressure. During the positioning of the valves 7 and 10 in the manner referred to the three-way valve is neutral, the positions of the parts just described being illustrated in Fig. 3. The inlet valve 7 is now closed to cut off communication between the inlet pipe 4 and supply pipe 5, whereby the body of air introduced to the chamber 1 is confined within said chamber. The pump 17 having been started liquid is forced from the tank 19 to the three-way valve 15, which has now been moved to the position shown in Fig. 4, and this results in the flow of the liquid to the spraying device 13 of the chamber 1. After a suitable amount of liquid has entered said chamber 1 the three-way valve 15 is again turned to neutral position, as illustrated in Fig. 5, and thereby cuts off the liquid supply from the chamber 1. At the same time the outlet valve 10 is moved to the position shown in Fig. 5, which establishes communication between the outlet pipe 4 of the chamber 1 and the discharge pipe 8, said valve 10 also cutting off communication between the outlet pipe 4 of the chamber 2 and said discharge pipe. In this position of the parts however, the inlet valve 7 is in the position illustrated in Fig. 5, cutting off communication between the supply pipe 5 and the inlet pipe 3 of the chamber 1, and establishing communication between said pipe 5 and the inlet pipe 3 of the chamber 2. Air under pressure now enters the chamber 2, and this air is heated by the steam coils of said chamber, as the air introduced to chamber 1 is also heated by the coils of that chamber when so introduced. When the desired quantity of air has been admitted to the chamber 2 the inlet valve 7 is swung to the position illustrated in Fig. 6, and the chamber 1 now being in communication with the supply pipe 5 and the discharge pipe 8, air will enter said chamber 1 from the blower to drive out the moisture-laden air from the chamber 1 and force the same into the dust collector 9, and in the latter the moisture is discharged to atmosphere, while the dust is precipitated in a manner well understood in the art. In the meantime, and as soon as the inlet valve 7 has closed to the position illustrated in Fig. 6, thereby confining the air within the chamber 2, the three-way valve 15 is turned in order to allow the liquid to be sprayed into said chamber 2. A suitable amount of liquid being so introduced, the three-way valve 15 is turned to cut off the liquid supply to the chamber 2, whereupon the inlet valve 7 and the outlet valve 10 are properly actuated to permit the air from the blower to be forced into the chamber 2, and thereby drive out the moisture-laden air into the dust collector 9, in the manner described in connection with chamber 1, thus separating the moisture which has been taken up by the air in the chamber 2 from the solid constituents, and allowing the latter which, as will be observed, are now in the form of a dry powder, to be precipitated in the dust collector.

The dust collector 9 has a discharge spout 24 controlled by a suitable gate 25, through the medium of which the powder collected thereby may be discharged therefrom, and each of the chambers 1 and 2 is also provided with a discharge spout 26 controlled by a gate 27, thus permitting any powder which may be precipitated in said tanks to be readily removed therefrom.

The illustrated dust collector 9, has its cylindrical wall 28 formed of foraminous material, such as textile fabric, which permits the moisture-laden air to pass readily therethrough but prevents passage of the powder.

While capable of wide range of application, the present invention is particularly designed for desiccating unstable complex organic liquids having a high moisture-content, such as milk, eggs, etc.

It will be noted that the liquid is always sprayed into a confined body of air, and that such air is quiescent except for the eddies caused by the incoming spray; and that when the air is in movement while being introduced into each desiccating chamber, and while being forced out therefrom, no liquid is sprayed into the current of air.

I claim:—

1. The process of desiccating organic liquids containing solids, which consists in introducing the liquid in finely-divided condition into a zone wherein a moisture absorbent is present, stopping the flow of the liquid whereby to desiccate the solids, and then effecting a separation of the moisture-laden absorbent from the desiccated product.

2. The process of desiccating organic liquids containing solids, which consists in confining a moisture absorbent in a closed chamber, bringing the liquid in a finely-divided condition into intimate contact with said moisture absorbent while so confined, stopping the flow of the liquid and confining the same within said chamber whereby to desiccate the solids, and then effecting a separation of the moisture-laden absorbent from the desiccated product.

3. The process of desiccating organic liquids containing solids, which consists in confining a body of air within a chamber, heating the air to expand the same, introducing the liquid in finely-divided condition into said chamber to bring the same into intimate contact with the air confined therein, whereby to desiccate the solids, and then effecting a separation of the moisture-laden air from the desiccated product.

4. The process of desiccating organic liquids containing solids, which consists in confining a body of air within a closed chamber, spraying the liquid into the closed chamber to bring the same into intimate contact with the air contained therein, whereby to desiccate the solids, and then effecting a separation of the moisture-laden air from the desiccated product.

5. The process of desiccating organic liquids containing solids, which consists in spraying the liquid into a closed chamber containing moisture-absorbing air to desiccate the solids, discharging the moisture-laden air into a dust collector after the spraying has ceased, and then separating the moisture-laden air from the desiccated product.

6. The process of desiccating organic liquids containing solids, which consists in spraying the liquid into a body of moisture-absorbing air confined within a chamber, and then discharging the moisture-laden air separate from the desiccated product.

7. The process of desiccating organic liquids containing solids, which consists in spraying the liquid into a body of moisture-absorbing air within a chamber, and then discharging the moisture-laden air separate from the desiccated product after the spraying has ceased.

8. The process of desiccating organic liquids containing solids, which consists in producing a current of air through a chamber, cutting off the source of air supply and confining the air within the chamber, spraying the liquid into the confined air within the chamber to desiccate the solids, and then effecting separation of the air from the solids.

9. The process of desiccating organic liquids containing solids, which consists in passing a current of air through a chamber, cutting off the flow of the air and confining the latter in the chamber, raising the temperature of the air while so confined, spraying the liquid into the confined air within the chamber to desiccate the solids, and then separating the air from the solids.

10. In the art of desiccating organic liquids containing solids, the steps which consist in establishing the flow of a moisture-absorbent agent under pressure, deflecting the flow of said agent into closed chambers in regular succession and confining the agent in said chambers, introducing the liquid into said chambers in finely-divided condition during the period of confinement of the moisture-absorbent agent therein, and thereby bringing the liquid into intimate contact with said moisture-absorbent agent, whereby to desiccate the solids, and then discharging the moisture-laden air from said chambers in regular succession and effecting a separation of the desiccated product therefrom.

In witness whereof I have hereunto set my hand on this 19th day of April 1912.

LEWIS C. MERRELL.

Witnesses:
M. D. CLARK,
W. B. CHERRY.